US011910165B2

(12) United States Patent
Andersson et al.

(10) Patent No.: US 11,910,165 B2
(45) Date of Patent: Feb. 20, 2024

(54) REMOVABLE ATTACHMENT OF A PASSIVE TRANSCUTANEOUS BONE CONDUCTION DEVICE WITH LIMITED SKIN DEFORMATION

(71) Applicants: Marcus Andersson, Gothenburg (SE); Kristian Asnes, Molndal (SE); Erik Martin Holgersson, Gothenburg (SE)

(72) Inventors: Marcus Andersson, Gothenburg (SE); Kristian Asnes, Molndal (SE); Erik Martin Holgersson, Gothenburg (SE)

(73) Assignee: Cochlear Limited, Macquarie University (AU)

(*) Notice: Subject to any disclaimer, the term of this patent is extended or adjusted under 35 U.S.C. 154(b) by 18 days.

(21) Appl. No.: 17/397,345

(22) Filed: Aug. 9, 2021

(65) Prior Publication Data

US 2022/0030363 A1 Jan. 27, 2022

Related U.S. Application Data

(60) Continuation of application No. 16/370,076, filed on Mar. 29, 2019, now Pat. No. 11,089,413, which is a (Continued)

(51) Int. Cl.

*H04R 25/00* (2006.01)
*H04R 1/46* (2006.01)
*H04R 1/24* (2006.01)

(Continued)

(52) U.S. Cl.

CPC ............ *H04R 25/606* (2013.01); *H04R 1/46* (2013.01); *H04R 1/24* (2013.01); *H04R 3/14* (2013.01); *H04R 9/025* (2013.01); *H04R 9/066* (2013.01); *H04R 25/556* (2013.01); *H04R 25/558* (2013.01); *H04R 25/607* (2019.05);

(Continued)

(58) Field of Classification Search

CPC .. H04R 2460/13; H04R 25/606; H04R 1/105; H04R 2420/07; H04R 25/00; H04R 5/033; H04R 1/1066; H04R 2499/11; H04R 25/407; H04R 25/70; H04R 1/00; H04R 1/1016; H04R 2225/021; H04R 25/505; H04R 25/607; H04R 2225/0213; H04R 1/24; H04R 1/46; H04R 3/14; H04R 9/025; H04R 9/066; H04R 25/556;

(Continued)

(56) References Cited

U.S. PATENT DOCUMENTS

2002/0183014 A1* 12/2002 Takeda .................... H04R 1/14 455/73
2006/0045298 A1* 3/2006 Westerkull ............ H02K 33/18 381/322

(Continued)

*Primary Examiner* — Norman Yu
(74) *Attorney, Agent, or Firm* — Pilloff Passino & Cosenza LLP; Martin J. Cosenza

(57) ABSTRACT

An external component including a vibratory portion configured to vibrate in response to a sound signal to evoke a hearing percept via bone conduction and including a coupling portion configured to removably attach the external component to an outer surface of skin of a recipient of the hearing prosthesis while imparting deformation to the skin of the recipient at a location of the attachment, in a one-gravity environment, of an amount that is about equal to or equal to that which results from the external component having mass.

24 Claims, 20 Drawing Sheets

Related U.S. Application Data continuation of application No. 14/715,735, filed on May 19, 2015, now Pat. No. 10,251,003, which is a division of application No. 13/596,477, filed on Aug. 28, 2012, now Pat. No. 9,049,527.

(51) Int. Cl.
*H04R 3/14* (2006.01)
*H04R 9/02* (2006.01)
*H04R 9/06* (2006.01)

(52) U.S. Cl.
CPC .. *H04R 2225/0213* (2019.05); *H04R 2225/67* (2013.01); *H04R 2460/13* (2013.01)

(58) Field of Classification Search
CPC ......................... H04R 25/558; H04R 2225/67; H04B 13/005; A61M 2210/0662
USPC ......... 381/151, 326, 322, 324, 74, 312, 315, 381/330, 361, 376, 380, 381
See application file for complete search history.

(56) References Cited

U.S. PATENT DOCUMENTS

| | | | | |
|---|---|---|---|---|
| 2007/0053536 | A1* | 3/2007 | Westerkull ........... | H04R 25/606 381/326 |
| 2008/0107289 | A1* | 5/2008 | Retchin .................. | H04R 5/023 381/151 |
| 2012/0215056 | A1* | 8/2012 | Hillbratt .............. | H04R 25/606 600/25 |

* cited by examiner

REMOVABLE ATTACHMENT OF A PASSIVE TRANSCUTANEOUS BONE CONDUCTION DEVICE WITH LIMITED SKIN DEFORMATION

The present application is a Continuation application of U.S. patent application Ser. No. 16/370,076, filed Mar. 29, 2019, which is a Continuation application of U.S. patent application Ser. No. 14/715,735, filed May 19, 2015, now U.S. Pat. No. 10,251,003, naming Marcus ANDERSSON as an inventor, which is a Divisional application of U.S. patent application Ser. No. 13/596,477, filed Aug. 28, 2012, now U.S. Pat. No. 9,049,527, the entire contents of these applications being hereby incorporated by reference herein in their entirety.

BACKGROUND

Field of the Invention

The present invention relates generally to hearing prostheses, and more particularly, to external components of a hearing prosthesis.

Related Art

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses a component positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, certain types of hearing prostheses commonly referred to as bone conduction devices, convert a received sound into mechanical vibrations. The vibrations are transferred through the skull to the cochlea causing generation of nerve impulses, which result in the perception of the received sound. Bone conduction devices may be a suitable alternative for individuals who cannot derive sufficient benefit from acoustic hearing aids.

SUMMARY

In an exemplary embodiment, there is a bone conduction device, comprising an external component including a vibratory portion configured to vibrate in response to a sound signal to evoke a hearing percept via bone conduction and including a coupling portion configured to removably attach the external component to an outer surface of skin of a recipient of the hearing prosthesis while imparting deformation to the skin of the recipient at a location of the attachment, in a one-gravity environment, of an amount that is about equal to or equal to that which results from the external component having mass.

In another exemplary embodiment, there is a bone conduction device, comprising an external component including a vibrator configured to vibrate in response to a sound signal to evoke a hearing percept via bone conduction, wherein the external component is configured to output respective vibrations from at least two surfaces opposite one another, the respective outputted vibrations being effectively substantially the same as one another.

In another exemplary embodiment, there is a bone conduction system, comprising a first bone conduction device of a first type configured to evoke a hearing percept within a first frequency range, and a second bone conduction device of a second type different from that of the first type and configured to evoke a hearing percept within a second frequency range, the second frequency range being a range including frequencies higher than the first frequency range.

In another exemplary embodiment, there is a method of evoking a hearing percept, comprising removably attaching an external component including a vibrator portion of a passive transcutaneous bone conduction device to skin of a recipient and generating vibrations with the vibrator portion such that the generated vibrations are transferred into skin of the recipient and into underlying bone of the recipient so as to evoke a hearing percept while the vibrator portion is removably attached to the skin of the recipient, wherein the removably attachment of the external portion is maintained while generating the vibrations without substantial static pressure on the skin contacting a first location of the external component through which vibrations are transferred to the skin.

BRIEF DESCRIPTION OF THE DRAWINGS

Embodiments of the present invention are described below with reference to the attached drawings, in which.

DETAILED DESCRIPTION

Figure 1:
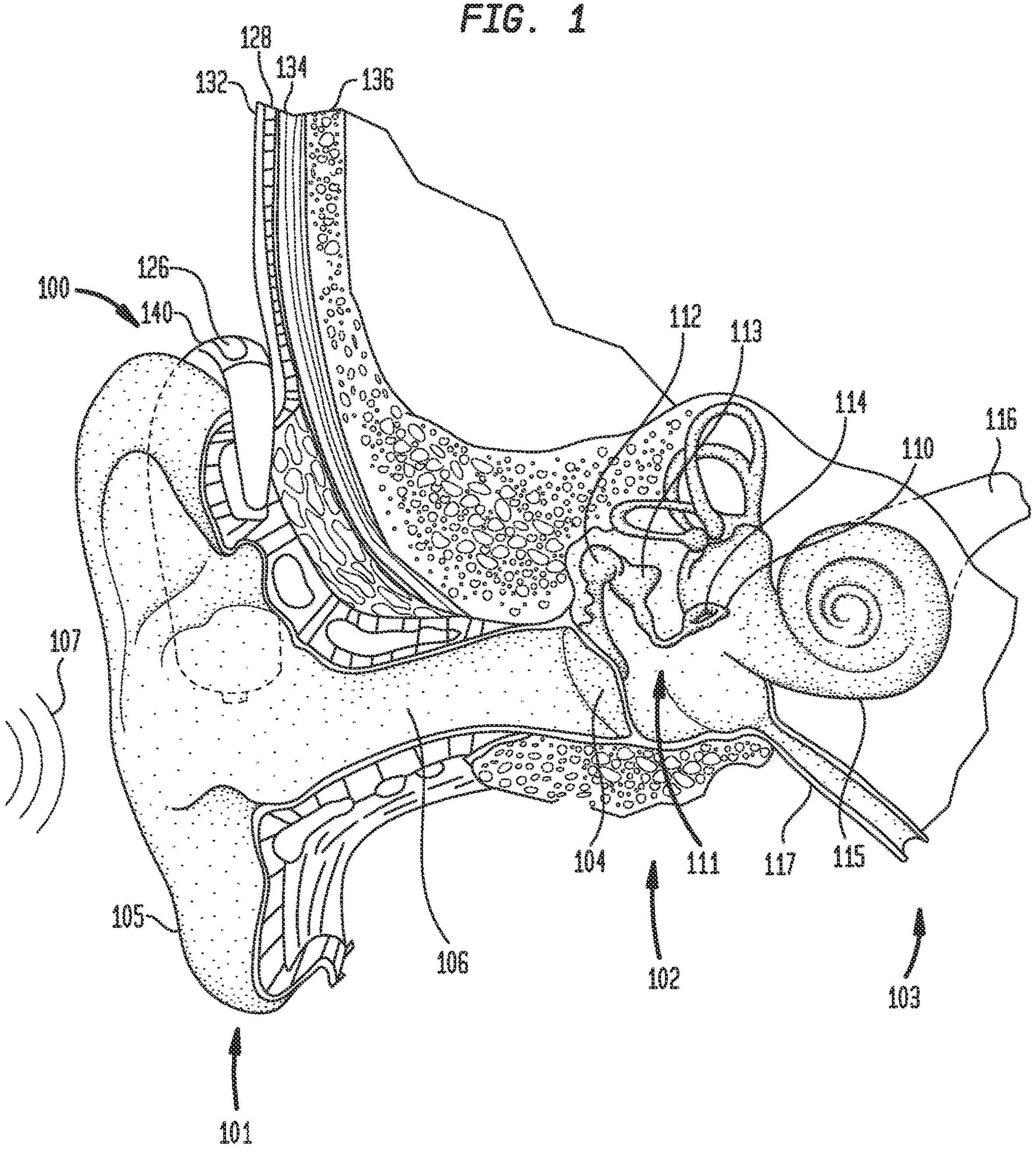
FIG. 1 is a perspective view of an exemplary bone conduction device in which embodiments of the present invention may be implemented.

FIG. 1 is a perspective view of a passive transcutaneous bone conduction device 100 in which embodiments of the present invention may be implemented, worn by a recipient. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 110 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 110 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1 also illustrates the positioning of conduction device 100 relative to outer ear 101, middle ear 102 and inner ear 103 of a recipient of device 100. As shown, bone conduction device 100 is positioned behind outer ear 101 of the recipient. Bone conduction device 100 comprises an external component 140 in the form of a behind-the-ear (BTE) device.

External component 140 typically comprises one or more sound input elements 126, such as microphone, for detecting and capturing sound, a sound processing unit (not shown) and a power source (not shown). The external component 140 includes an actuator (not shown), which in the embodiment of FIG. 1, is located within the body of the BTE device, although in other embodiments, the actuator may be located remote from the BTE device (or other component of the external component 140 having a sound input element, a sound processing unit and/or a power source, etc.).

It is noted that sound input element 126 may comprise, for example, devices other than a microphone, such as, for example, a telecoil, etc. In an exemplary embodiment, sound input element 126 may be located remote from the BTE device and may take the form of a microphone or the like located on a cable or may take the form of a tube extending from the BTE device, etc. Alternatively, sound input element 126 may be subcutaneously implanted in the recipient, or positioned in the recipient's ear. Sound input element 126 may also be a component that receives an electronic signal indicative of sound, such as, for example, from an external audio device. For example, sound input element 126 may receive a sound signal in the form of an electrical signal from an MP3 player electronically connected to sound input element 126.

The sound processing unit of the external component 140 processes the output of the sound input element 126, which is typically in the form of an electrical signal. The processing unit generates control signals that cause the actuator to vibrate. In other words, the actuator converts the electrical signals into mechanical vibrations for delivery to the recipient's skull.

As noted above, with respect to the embodiment of FIG. 1, bone conduction device 100 is a passive transcutaneous bone conduction device. That is, no active components, such as the actuator, are implanted beneath the recipient's skin 132. In such an arrangement, as will be described below, the active actuator is located in external component 140.

The embodiment of FIG. 1 is depicted as having no implantable component. That is, vibrations generated by the actuator are transferred from the actuator, into the skin directly from the actuator and/or through a housing of the BTE device, through the skin of the recipient, and into the bone of the recipient, thereby evoking a hearing percept without passing through an implantable component. In this regard, it is a totally external bone conduction device. Alternatively, in an exemplary embodiment, there is an implantable component that includes a plate or other applicable component, as will be discussed in greater detail below. The plate or other component of the implantable component vibrates in response to vibration transmitted through the skin.

Figure 2A:
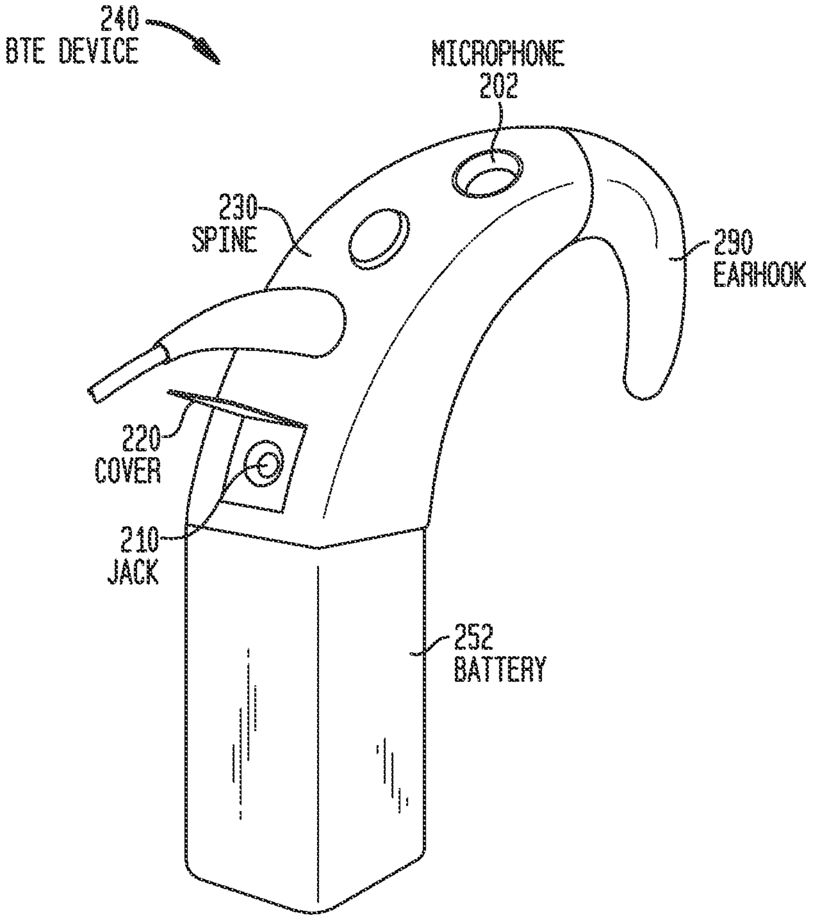
FIG. 2A is a perspective view of a Behind-The-Ear (BTE) device according to an exemplary embodiment.

FIG. 2A is a perspective view of a BTE device 240 of a hearing prosthesis, which, in this exemplary embodiment, corresponds to the BTE device (external component 140) detailed above with respect to FIG. 1. BTE device 240 includes one or more microphones 202, and may further include an audio signal jack 210 under a cover 220 on the spine 230 of BTE device 240. It is noted that in some other embodiments, one or both of these components (microphone 202 and/or jack 210) may be located on other positions of the BTE device 240, such as, for example, the side of the spine 230 (as opposed to the back of the spine 230, as depicted in FIG. 2), the ear hook 290, etc. FIG. 2A further depicts battery 252 and ear hook 290 removably attached to spine 230.

Figure 2B:
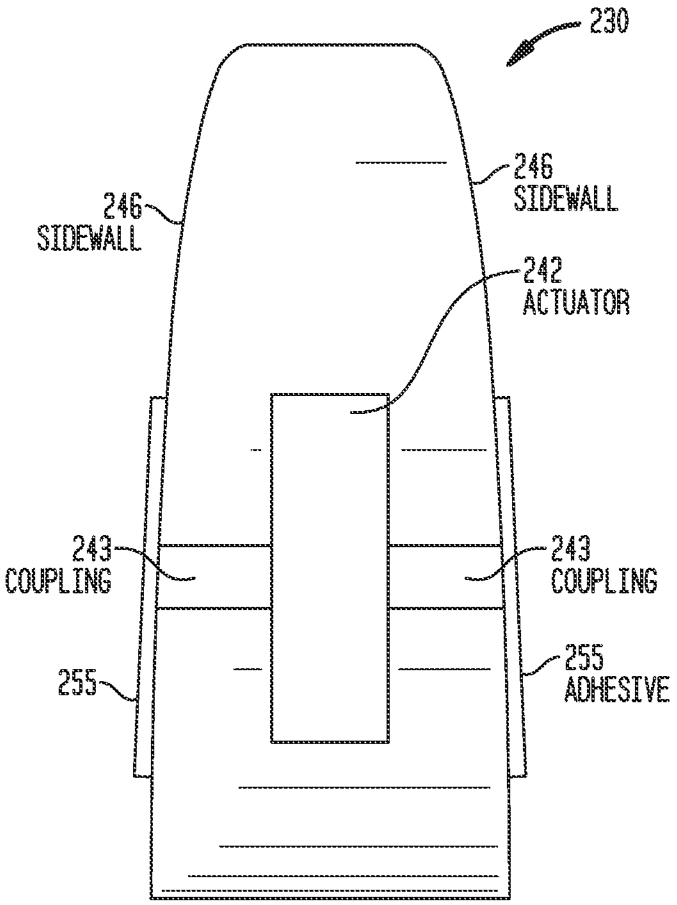
FIG. 2B is a cross-sectional view of a spine of the BTE device of FIG. 2A.

FIG. 2B is a cross-sectional view of the spine 230 of BTE device 240 of FIG. 2A. Actuator 242 is shown located within the spine 230 of BTE device 242. Actuator 242 is a vibrator actuator, and is coupled to the sidewalls 246 of the spine 230 via couplings 243 which are configured to transfer vibrations generated by actuator 242 to the sidewalls 246, from which those vibrations are transferred to skin 132. In an exemplary embodiment, couplings 543 are rigid structures having utilitarian vibrational transfer characteristics. The sidewalls 246 form at least part of a housing of spine 230. In some embodiments, the housing hermetically seals the interior of the spine 230 from the external environment.

In the embodiment of FIGS. 2A and 2B, the BTE device 240 forms a self-contained transcutaneous bone conduction device. It is a passive transcutaneous bone conduction device in that the actuator 242 is located external to the recipient.

FIG. 2B depicts adhesives 255 located on the sidewalls 246 of the BTE device 240. As will be detailed below, adhesives 255 form coupling portions that are respectively configured to removably adhere the BTE device 240 to the recipient via adhesion at the locations of the adhesives 255. This adherence being in addition to that which might be provided by the presence of the earhook 290 and/or any grasping phenomenon resulting from the auricle 105 of the outer ear and the skin overlying the mastoid bone of the recipient. Accordingly, in an exemplary embodiment, there is an external component, such as a BTE device, that includes a coupling portion that includes a surface configured to directly contact the outer skin. This coupling portion is configured to removably attach the external component to an outer surface of skin of the recipient via attraction of the contact surface to the respective contact portion of the outer skin.

It is noted that the embodiment of FIG. 2B is depicted with adhesives 255 located on both sides of the BTE device. In an exemplary embodiment of this embodiment, this permits the adherence properties detailed herein and/or variations thereof to be achieved regardless of whether the recipient wears the BTE device on the right side (in accordance with that depicted in FIG. 1) or the left side (or wears two BTE devices). In an alternate embodiment, BTE device 240 includes adhesive only on one side (the side appropriate for the side on which the recipient intends to wear the BTE device 240). An embodiment of a BTE device includes a dual-side compatible BTE bone conduction device, as will be detailed below.

The adhesives 255 are depicted in FIG. 2B in an exaggerated manner so as to be more easily identified. In an exemplary embodiment, the adhesives 255 are double sided tape, where one side of the tape is protected by a barrier, such as a silicone paper, that is removed from the skin-side of the double-sided tape in relatively close temporal proximity to the placement of the BTE device 240 on the recipient. In an exemplary embodiment, adhesives 255 are glue or the like. In an exemplary embodiment where the adhesives 255 are glue, the glue may be applied in relatively close temporal proximity to the placement of the BTE device 240 on the recipient. Such application may be applied by the recipient to the spine 230, in an exemplary embodiment.

In an alternate embodiment, the adhesives 255 are of a configuration where the adhesive has relatively minimal adhesive properties during a temporal period when exposed to some conditions, and has relatively effective adhesive properties during a temporal period, such as a latter temporal period, when exposed to other conditions. Such a configuration can provide the recipient control over the adhesive properties of the adhesives.

By way of example, the glue and/or tape (double-sided or otherwise) may be a substance that obtains relatively effective adhesive properties when exposed to oil(s) and/or sweat produced by skin, when exposed to a certain amount of pressure, when exposed to body heat, etc., and/or a combination thereof and/or any other phenomena that may enable the teachings detailed herein and/or variations thereof to be practiced. Such exemplary phenomenon may be, for example, heat generated via friction resulting from the recipient rubbing his or her finger across the glue. In an exemplary embodiment, the pressure can be a pressure above that which may be expected to be experienced during normal handling of the spine 230.

In an exemplary embodiment, the adhesives 255 are contained in respective containers that exude glue or the like when exposed to certain conditions, such as by way of example and not by way of limitation, the aforementioned conditions. Alternatively and/or in addition to this, the recipient may puncture or otherwise open the containers to exude the glue or the like.

Any device, system and/or method that will enable a recipient to practice the teachings detailed herein and/or variations thereof associated with the adherence of the bone conduction device to skin of the recipient for vibration transmission can be utilized in some embodiments.

In an exemplary embodiment, the vibrator actuator 242 is a device that converts electrical signals into vibration. In operation, sound input element 202 converts sound into electrical signals. Specifically, these signals are provided to vibrator actuator 242, or to a sound processor (not shown) that processes the electrical signals, and then provides those processed signals to vibrator actuator 242. The vibrator actuator 242 converts the electrical signals (processed or unprocessed) into vibrations. Because vibrator actuator 242 is mechanically coupled to sidewalls 246, the vibrations are transferred from the vibrator actuator 342 to skin 132 of the recipient.

Figure 2C:
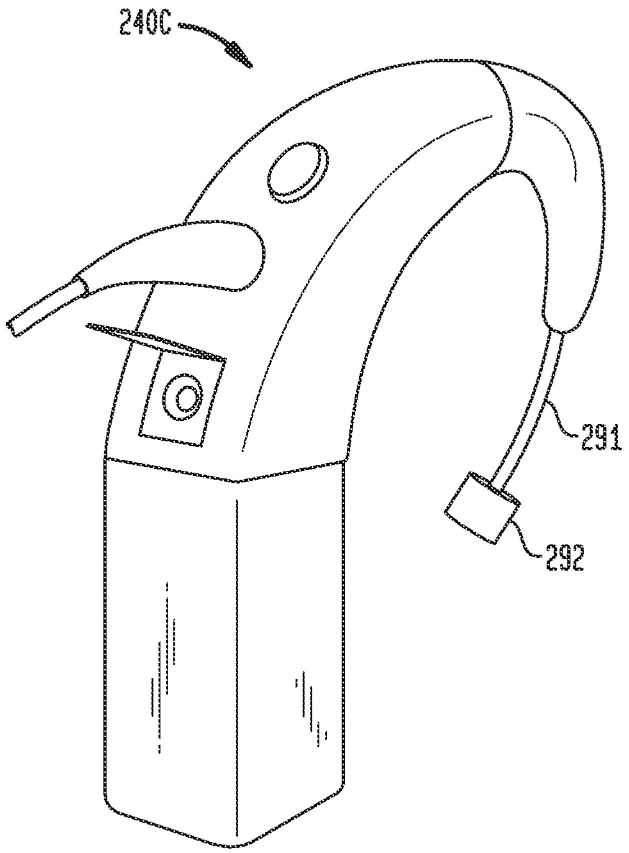
FIG. 2C is a perspective view of an alternate embodiment of a BTE device.

FIG. 2A depicts the sound input element 202 as being located at about the apex of spine 230. FIG. 2C depicts an alternate embodiment of a BTE device 240C in which the sound input element 292 is mounted on a stem 291 extending from the ear hook 290. In an exemplary embodiment, the stem 291 is such that during normal use, the sound input element 292 is located below the ear, in the area of the auricular concha, or in the ear canal. Such a configuration can have utilitarian value by way of reducing feedback as compared to that which may result from the embodiment of FIG. 2A.

Figure 3A:
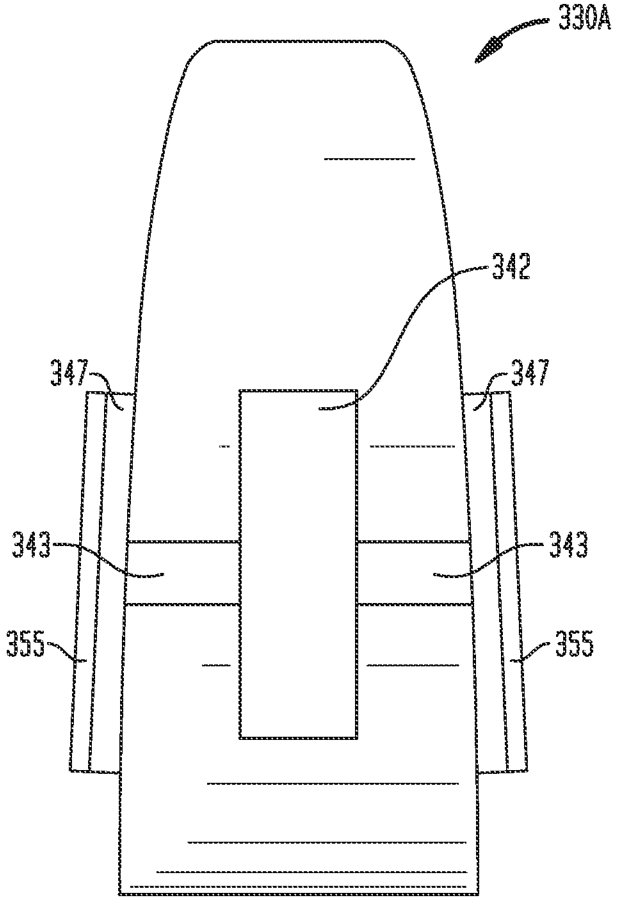
FIG. 3A is a cross-sectional view of a spine of the BTE device according to an alternate embodiment.

It is noted that while the embodiments depicted in FIGS. 2A and 2B detail the vibrations being transferred from the vibrator actuator 242 to the sidewalls 246 via the couplings 243, in other embodiments, the vibrations are transferred to plates or other devices that are located outside of the sidewalls 246. FIG. 3A depicts such an exemplary embodiment, where spine 330A includes couplings 343 extending through sidewalls 346 to plates 347, on which adhesives 255 are located.

Figure 3B:
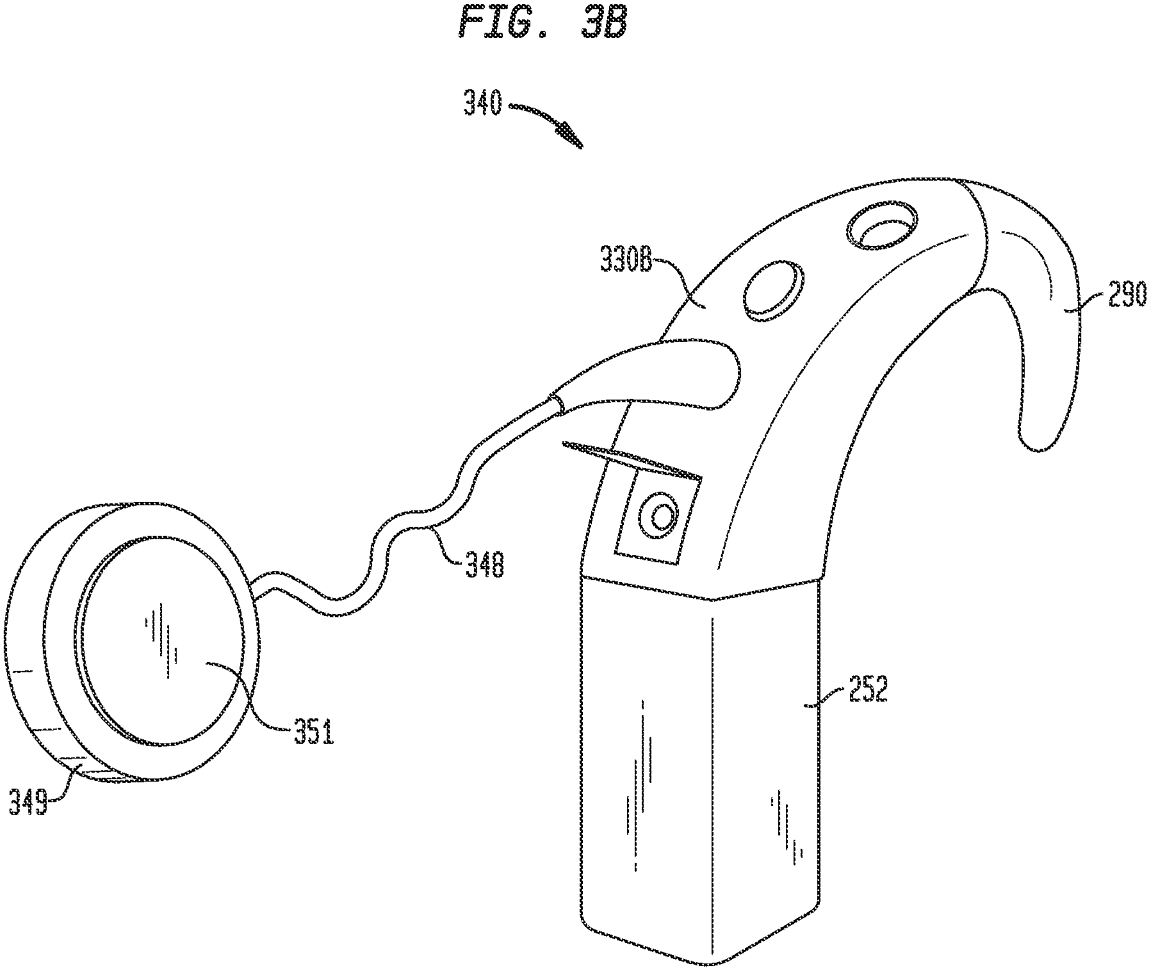
FIG. 3B is a perspective view of an alternate embodiment of an external device including a BTE device.

FIG. 3B depicts an alternate embodiment of an external component of a bone conduction device, BTE device 340, in which the vibrator actuator is located in a remote vibrator actuator unit 349. This as opposed to the spine 330B. Vibrator actuator unit 347 is in electronic communication with spine 330B via cable 348. Spine 330B functionally corresponds to the spines detailed above, with the exception of the features associated with containing a vibrator actuator therein. In this regard, electrical signals are transferred to the vibrator actuator in vibrator actuator unit 349, these signals being, in some embodiments, the same as those which are provided to the other vibrator actuators detailed herein. Vibrator actuator unit 349 may include a coupling 351 to removably attach the unit 349 to outer skin of the recipient. Coupling 351 can correspond to the couplings detailed herein. Such a coupling may include, for example, adhesive.

Such a configuration as that of BTE device 340, can have utilitarian value by way of reducing feedback as compared to that which may result from the embodiment of FIG. 2A.

In some exemplary embodiments, any device, system and or method that will enable the teachings detailed herein and/or variations thereof associated with vibration transmission from the actuator to the skin and/or to bone of the recipient may be utilized.

Figure 4:
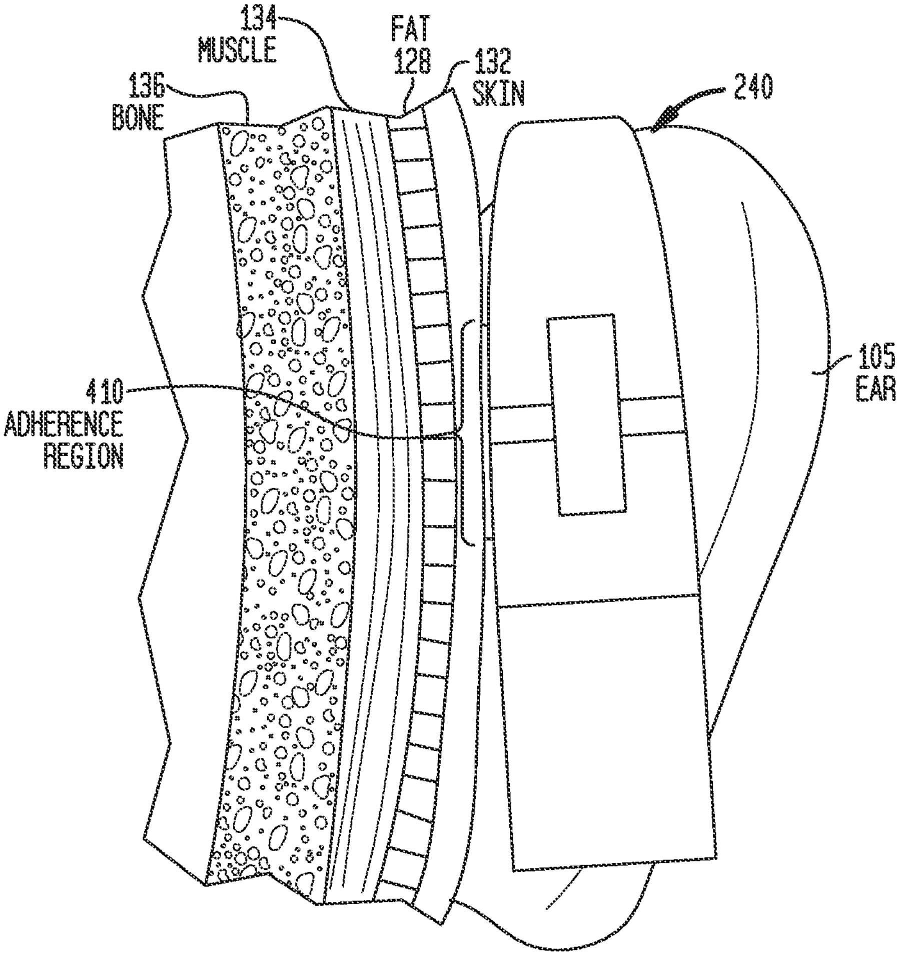
FIG. 4 is a rear view of BTE device of FIG. 2A removably attached to skin of a recipient.

FIG. 4 depicts an example of the BTE device 240 positioned on a right side of a recipient In this regard, FIG. 4 presents a view of a recipient utilizing a BTE device from behind the depiction of FIG. 1). Adhesives are not depicted for purposes of clarity. However, an adherence region 410 resulting from the adhesive is depicted, as may be seen. It is noted that depending on certain factors, the adherence region 410 may not encompass the total area established by the adhesive. Such factors may include, by way of example and not by limitation, the local topography of the skin (curvatures, bumps, etc.), the elasticity of the skin, the curvature of the housing of the spine 230 of the BTE device, the extent to which the adhesives extend along the spine 230, the elasticity and/or plasticity of the adhesives, etc.

In the embodiment of FIG. 4, the coupling portion is configured such that the adherence region 410 is behind an auricle of the recipient and directly overlying a mastoid bone of the recipient.

The embodiments of FIGS. 2A-4 are configured such that the coupling portion (e.g., the adhesive) removably attaches the BTE to an outer surface of skin 132 of the recipient without gripping or imparting a suction onto the outer skin of the recipient or applying a compressive force or pressure to the outer skin of the recipient, at least beyond that resulting from the fact that the BTE 240 has mass. This as compared to, for example, an external component of a bone conduction device that relies on for removable attachability purposes (i) magnetic attraction between the external component and an implantable/implanted component, (ii) suction between the external component and the outer skin of the recipient, such as by way of example that resulting in application of the teachings of U.S. Pat. No. 4,791,673 and/or (iii) gripping skin. That is, an exemplary embodiment utilizes a coupling portion that does not utilize one or more or all of these devices, systems and/or methods.

Along these lines, at least some embodiments utilize an exemplary coupling portion that removably attaches the external component to an outer surface of skin of a recipient of the hearing prosthesis while imparting a given amount of deformation to the skin of the recipient at a location of the attachment. At least some embodiments utilizing the adhesives as detailed herein have such coupling portions. Such amount of deformation can be quantified as deformation, in a one-gravity environment, of an amount that is about equal to or equal to that which results from the external component (e.g., BTE device) having mass. This as compared to the deformation resulting from one or more or all of the aforementioned devices, systems and/or methods associated with "i," "ii," and "iii" detailed in the preceding paragraph.

An exemplary embodiment includes a coupling portion that results in relatively little compressive stress on the skin of the recipient. In an exemplary embodiment, an external component may include a coupling portion configured to removably attach the external component to an outer surface of skin of a recipient while imparting total shear stress to the skin of the recipient at a location of the attachment of a given amount while further imparting a compressive stress, if any, of less than that to the skin. In an exemplary embodiment, the total shear stress may be an amount "S," and the compressive stress may be no more than about, 0.5×S, about 0.4×S, about 0.3×S, about 0.2×S, about 0.15×S, about 0.1×S, and/or about 0.05×S. In an exemplary embodiment, S may be a percentage of weight of the external component divided by the total area of the adherence region 410. In an exemplary embodiment, the percentage is 100%, such as may be the case with respect to an external component that is a device other than a BTE device (further details below) and/or the BTE device is located such that it is not resting on the auricle of the recipient, etc.

In an exemplary embodiment, the coupling portion detailed herein and/or variations thereof is configured to removably attach an external component (BTE device or otherwise) to an outer surface of skin of a recipient of the bone conduction device without substantially compressing or tensiling the skin at the location of coupling while attached. In an exemplary embodiment the coupling portion is configured to removably attach an external component (BTE device or otherwise) to an outer surface of skin of a recipient of the bone conduction device such that a combination of compressive stress and tensile stress applied to the skin at the location of the attachment is about zero. In this regard, compressive stress may result from the external component rotating slightly about its center of gravity due to the effects of gravity. Accordingly, compressive stress and tensile stress may exist at the adherence region 410 owing to gravity. Still, the resulting compressive stress will generally cancel out the resulting tensile stress, as the two will generally be equal because the external component—skin system is in equilibrium.

As noted above, an exemplary embodiment includes a dual-side compatible BTE bone conduction device. FIGS. 2A-3B depict such devices (with respect to the embodiment of FIG. 3B, the vibrator actuator unit 349 may be rotated 180 degrees about cable 348 to achieve the dual-sided compatibility). It is noted that such devices do not require coupling portions (e.g., adhesive) on both sides as depicted in FIGS. 2B-3, although such may be utilized. It is further noted that embodiments that utilize the coupling portions detailed herein, such as the coupling portions utilizing the adhesives, can be practiced in devices other than dual-side compatible BTE bone conduction devices (or external components).

An exemplary embodiment of a dual-side compatible BTE bone conduction device refers to a BTE bone conduction device that can be worn on the left side of a recipient and, alternatively, on the right side of the recipient, in the manner that a BTE device is to be worn, such that vibrations generated by the BTE device can be effectively samely transmitted to respective portions of skin of the recipient to evoke a hearing percept regardless of which side the BTE device is worn.

In an exemplary embodiment, there is a BTE device, such as those depicted in FIGS. 2A-C (and FIG. 5E discussed below), configured to output respective vibrations from at least two surfaces opposite one another, the respective outputted vibrations being effectively substantially the same as one another. It is noted that vibrations that are out of phase are encompassed by effectively substantially the same as one another.

Figure 5A:
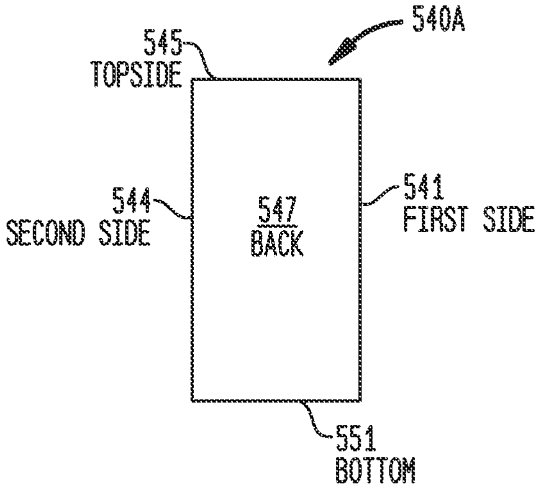
FIGS. 5A and 5B are functional schematics of an exemplary BTE device according to an embodiment.
Figure 5B:
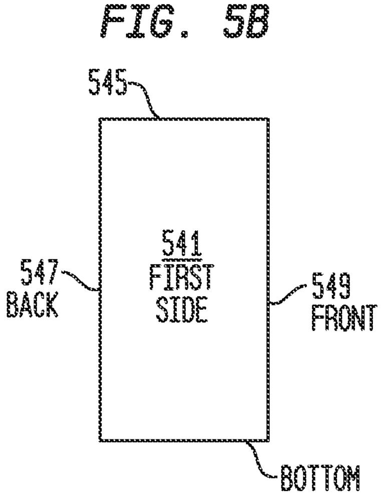
Figure 5C:
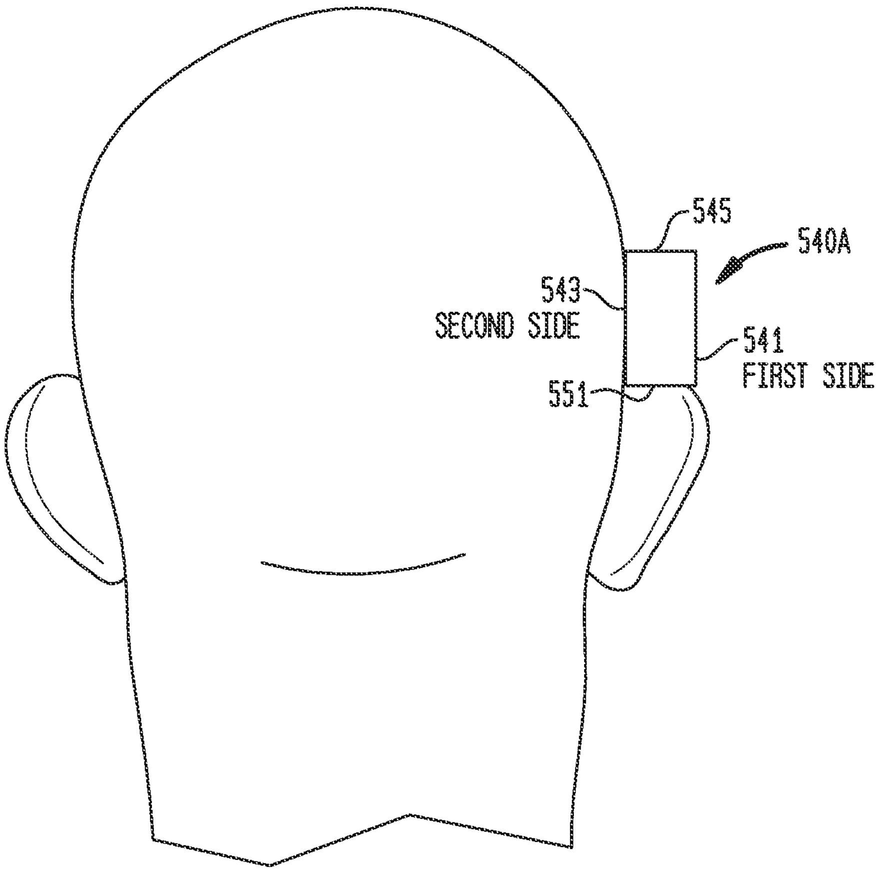
FIGS. 5C and 5D depict application of the exemplary BTE device of FIGS. 5A and 5B.
Figure 5D:
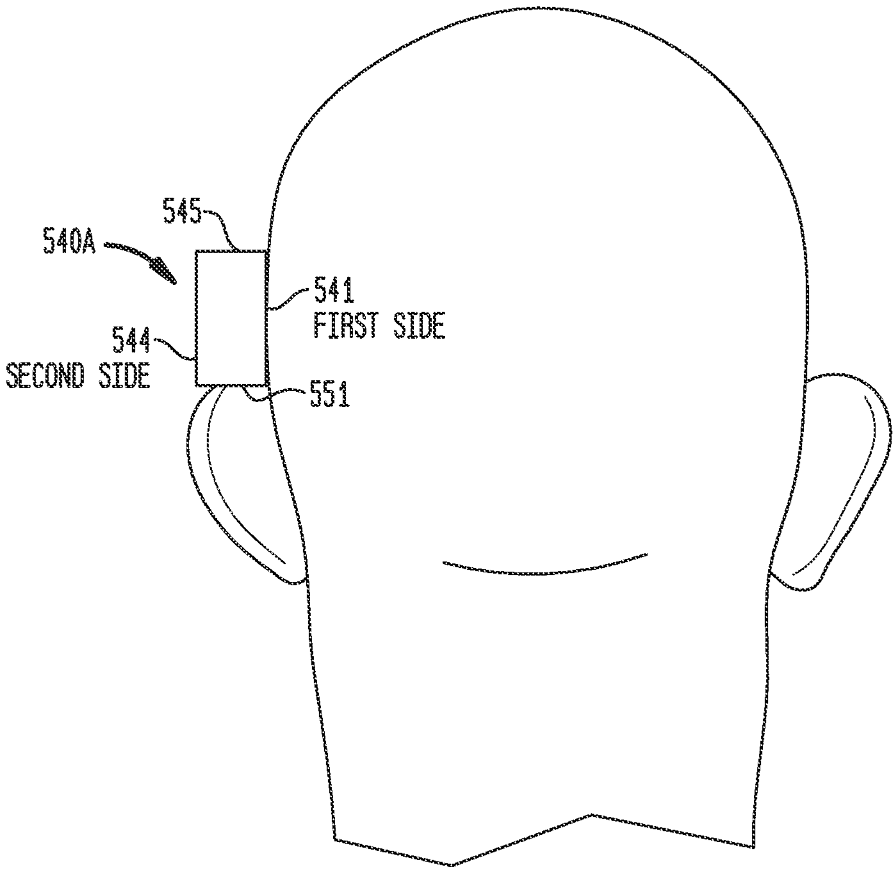

Such a device can have utility as follows. FIGS. 5A and 5B are functional representations of an embodiment of an external component 540A of a bone conduction device, such as a BTE bone conduction device, configured to be removably attached to a recipient of the bone conduction device at a first location on the recipient such that a first of the two surfaces contacts skin of the recipient. FIG. 5A depicts a rear view of the external component 540A, and FIG. 5B depicts a side view of the external component 540A. External component 540A is configured for attachment to a side of a recipient's body, such as a side of a recipient's head (e.g., behind the ear). Use of external component 540A includes scenarios where the external component 540A is to be used on either side of the recipient, and the front side 549 is to always be facing forward irrespective of the side on which the external component 540A is located (e.g., a microphone may be positioned on the front side 549, and it is utilitarian to have the microphone always facing forward, etc.). As may be seen, the external component 540A has a first side 541, a second side 544, a back 547 and a bottom 551, along with front 549. It is noted that while the functional diagrams of FIGS. 5A and 5B are depicted has having discrete sides orthogonal to one another, the boundaries of which are clearly defined, embodiments of the external component 540A can have relatively undefined sides. In this regard, the depictions of FIGS. 5A and 5B are conceptual to convey the broad concept of the embodiment. To this end, the external component 540A is further configured to be removably attached to the recipient of the bone conduction device at second location on the recipient such that a second of the two surfaces contacts skin of the recipient, the second location being a substantially symmetrically opposite location of the first location of the recipient. FIGS. 5C and 5D depict use of such an exemplary embodiment. In an exemplary embodiment, adhesive is located on side 544 and/or on side 541, depending on which side the external component 540A is to be worn, although it is noted that some embodiments of external component 540A are such that there is no such coupling component.

In an exemplary embodiment, the functionality of external component 540A is achieved by utilizing a balanced vibrator actuator, as will now be described.

Figure 5E:
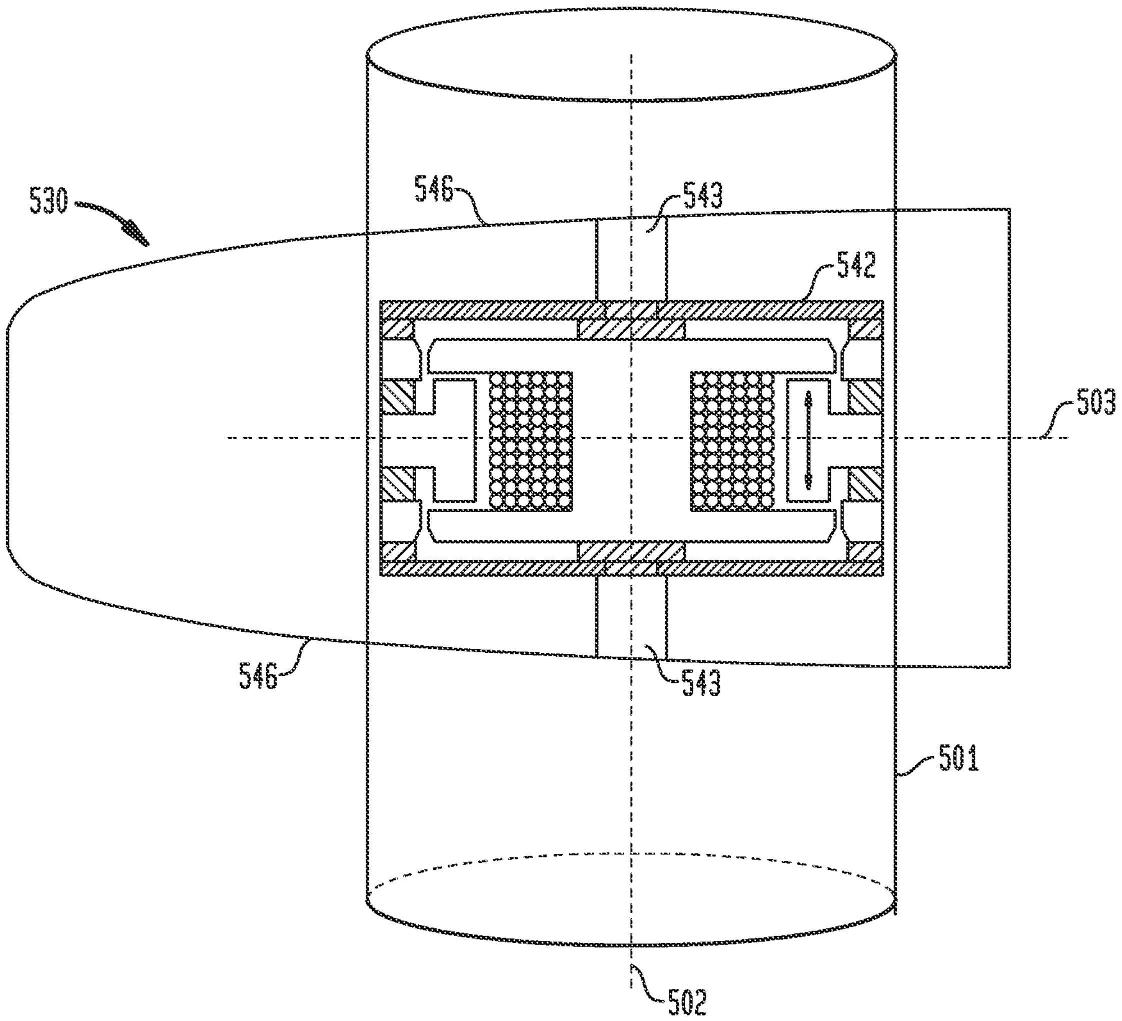
FIG. 5E is a cross-sectional view of an exemplary spine of a BTE device according to an embodiment.

FIG. 5E depicts a spine 530, which can correspond to any of the spines detailed herein and/or variations thereof, of a bone conduction device corresponding to external component 540A. The spine 530 includes a balanced vibrator actuator 542. Couplings 543 functionally and/or structurally correspond to couplings 243 detailed above. Sidewalls 546 correspond to sidewalls 246 detailed above. Accordingly, FIG. 5E depicts an example of sidewall parts that are structurally linked together via the vibrator actuator. Such can have utilitarian value in that the vibrator actuator can be used as a linking component, negating potential requirement for other such linking components in some embodiments. In an exemplary embodiment, outer surfaces of the sidewalls correspond to the respective two surfaces opposite one another detailed above.

An exemplary embodiment includes a bone conduction device, such as a BTE device, having a degree of symmetry. Specifically, an exemplary bone conduction device includes spine 530. A cylindrical volume 501 having an axis 502 concentric with a direction of relative movement of vibratory components of the vibrator actuator (e.g., the counterweight assembly, detailed below) is superimposed on/through the spine 530, as may be seen in FIG. 5E. The superimposed cylindrical volume 501 is such that it extends axially beyond boundaries of the spine 530. In the exemplary embodiment, components of the spine 530 within the cylindrical volume 501 are symmetric relative to a plane 503 normal to the axis 502. In an exemplary embodiment, this cylindrical volume has a diameter of about 10 mm.

In some embodiments, the vibrator is rectangular with a diameter of 10-15 mm. It should be appreciated, however, that the choice of form factor will depend on specific packaging requirements and, in certain circumstances, to how the efficiency of the vibrator is related to the form factor (long and slender dimensions compared to relatively shorter and wider dimensions). It is also noted that the total volume of the vibrator will depend primarily on how much low frequency output is required from the device.

It is noted that components of the spine 530 outside the cylindrical volume 501 need not be symmetric about the plane 503. In this regard, the cylindrical volume 501 forms a boundary between the symmetrical components/parts thereof and the components/parts thereof which may or may not be symmetrical.

Some details pertaining to the specifics of an exemplary balanced vibrator actuator will now be detailed, followed by a brief discussion of exemplary phenomenon associated with the balanced vibrator actuator harnessed in some exemplary embodiments. It is noted that at least some of the teachings detailed herein and/or variations thereof can be practiced with an actuator that is not balanced. Furthermore, while the vibrator actuator 542 is a electromagnetic vibrating actuator, other types of vibrator actuators can be utilized in some embodiments, such as, by way of example, a piezoelectric vibrator actuator. Any type of vibrator that will enable the teachings detailed herein and/or variations thereof to be practiced may be utilized in at least some embodiments.

Figure 6A:
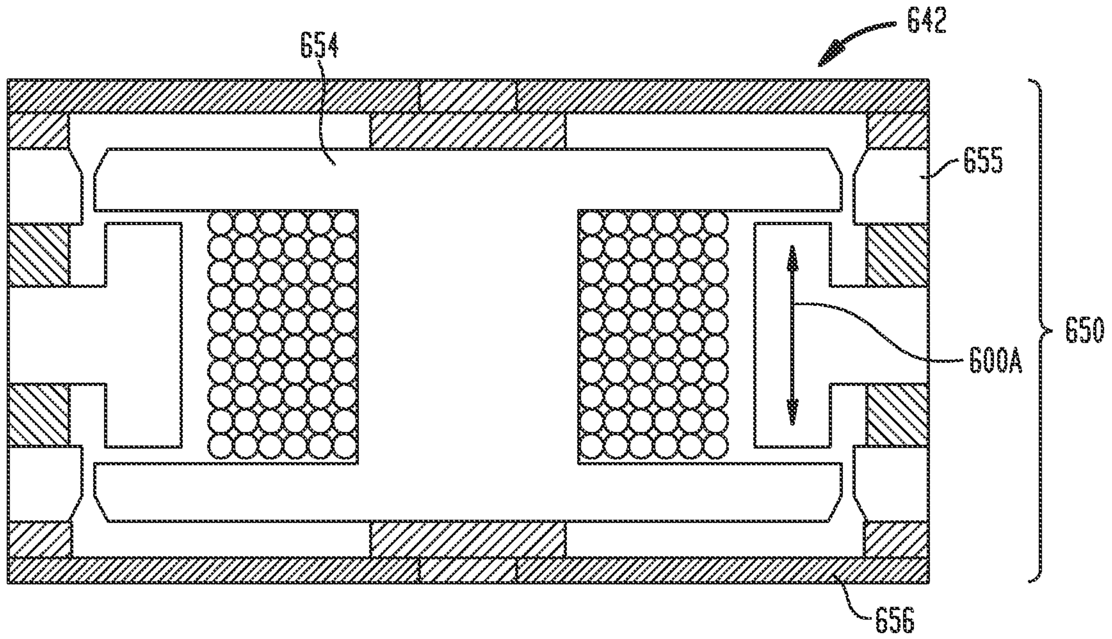
FIGS. 6A-7B depict features of an exemplary balanced electromagnetic vibrator actuator according to an embodiment.

FIG. 6A is a cross-sectional view of an exemplary balanced vibrator actuator 642, which can correspond to the balanced vibrator actuator 542 detailed above. It is noted that the teachings detailed herein associated with actuator 642 not directly related to a balanced vibrator actuator can be applicable to embodiments utilizing a non-balanced vibrator actuator.

Actuator 642 is a balanced electromagnetic vibrating actuator. In operation, sound input element 126 (FIG. 1) converts sound into electrical signals. As noted above, the bone conduction device provides these electrical signals to a sound processor which processes the signals and provides the processed signals to the balanced vibrator actuator 642, which then converts the electrical signals (processed or unprocessed) into vibrations. Because vibrator actuator 642 is mechanically coupled to sidewalls 546 via couplings 543 (or other devices as can be utilized in other embodiments), the vibrations are transferred from actuator 642 to the sidewalls 546 and then to the recipient via transmission from a respective surface of the sidewalls 546.

Figure 6B:
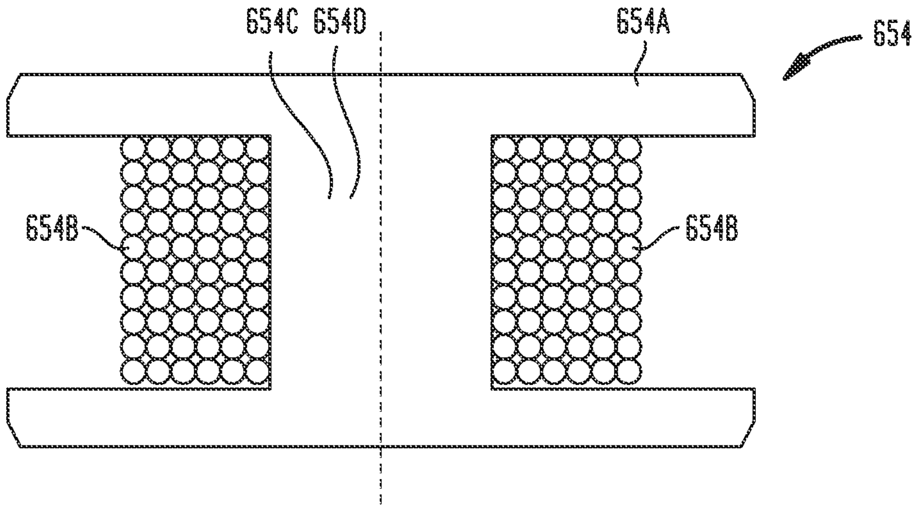

As illustrated in FIG. 5E, electromagnetic vibrating actuator 642 includes a bobbin assembly 654 and a counterweight assembly 655. For ease of visualization, FIG. 6B depicts bobbin assembly 654 separately. As illustrated, bobbin assembly 654 includes a bobbin 654*a* and a coil 654*b* that is wrapped around a core 654*c* of bobbin 654*a*. In the illustrated embodiment, bobbin assembly 654 is radially symmetrical.

Figure 6C:
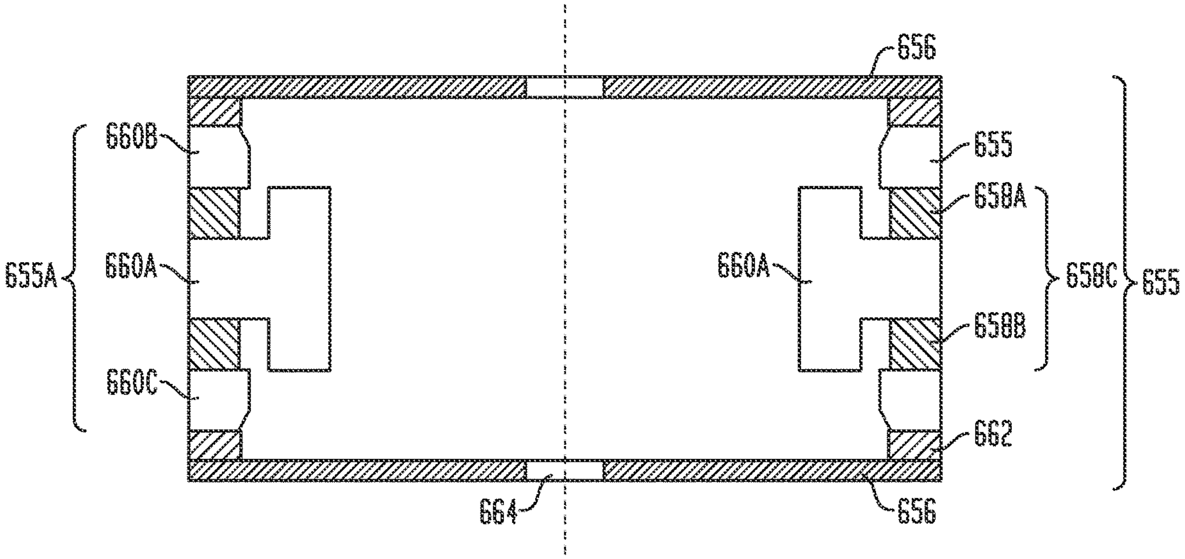

FIG. 6C illustrates counterweight assembly 655 separately, for ease of visualization. As illustrated, counterweight assembly 655 includes springs 656, permanent magnets 658*a* and 658*b*, yokes 660*a*, 660*b* and 660*c*, and spacers 662. Spacers 662 provide a connective support between springs 656 and the other elements of counterweight assembly 655 just detailed. Springs 656 connect bobbin assembly 654 to the rest of counterweight assembly 355, and permits counterweight assembly 655 to move relative to bobbin assembly 654 upon interaction of a dynamic magnetic flux, produced by bobbin assembly 654. This dynamic magnetic flux is produced by energizing coil 654*b* with an alternating current. The static magnetic flux is produced by permanent magnets 658*a* and 658*b* of counterweight assembly 655, as will be described in greater detail below. In this regard, counterweight assembly 655 is a static magnetic field generator and bobbin assembly 654 is a dynamic magnetic field generator. As may be seen in FIGS. 6A and 6C, holes 664 in springs 656 provide a feature that permits the couplings 543 to be rigidly connected to bobbin assembly 654.

It is noted that while the embodiment depicted in the FIGs. utilizes two springs 656 (and spacers 662), other embodiments utilizing a balanced vibrator actuator can utilize a single spring 656 providing that the teachings detailed herein and/or variations thereof may be achieved.

It is noted that while embodiments presented herein are described with respect to a device where counterweight assembly 655 includes permanent magnets 658*a* and 658*b* that surround coil 654*b* and moves relative to couplings 543 during vibration of actuator 642, in other embodiments, the coil may be located on the counterweight assembly 655 as well, thus adding weight to the counterweight assembly 655 (the additional weight being the weight of the coil).

With respect to the embodiment depicted in FIG. 5E, owing to the couplings 543, bobbin assembly 654 is substantially rigidly mechanically linked to the two sidewalls. Accordingly, counterweight assembly 655 moves relative to the two sidewalls and relative to the bobbin assembly 654. In an alternate embodiment, counterweight assembly 655 is substantially rigidly mechanically linked via couplings to the two sidewalls, and bobbin assembly 654 moves relative to the two sidewalls and relative to the counterweight assembly 655. Any structural configuration that will enable the teachings detailed here and/or variations thereof to be practiced can be utilized in some embodiments.

As noted, bobbin assembly 654 is configured to generate a dynamic magnetic flux when energized by an electric current. In this exemplary embodiment, bobbin 654*a* is made of a soft iron. Coil 654*b* may be energized with an alternating current to create the dynamic magnetic flux about coil 654*b*. The iron of bobbin 654*a* is conducive to the establishment of a magnetic conduction path for the dynamic magnetic flux. Conversely, counterweight assembly 655, as a result of permanent magnets 658*a* and 658*b*, in combination with yokes 660*a*, 660*b* and 660*c*, which are made from a soft iron, generate, due to the permanent magnets, a static magnetic flux. The soft iron of the bobbin and yokes may be of a type that increases the magnetic coupling of the respective magnetic fields, thereby providing a magnetic conduction path for the respective magnetic fields.

Figure 7A:
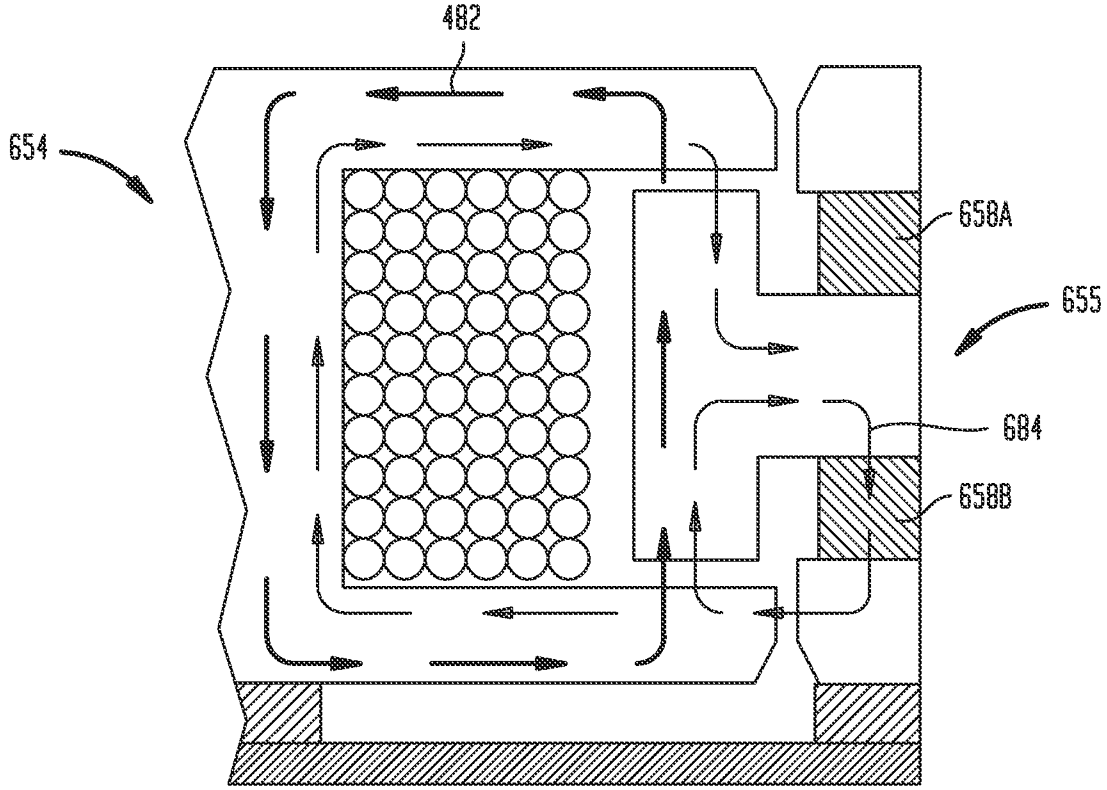
Figure 7B:
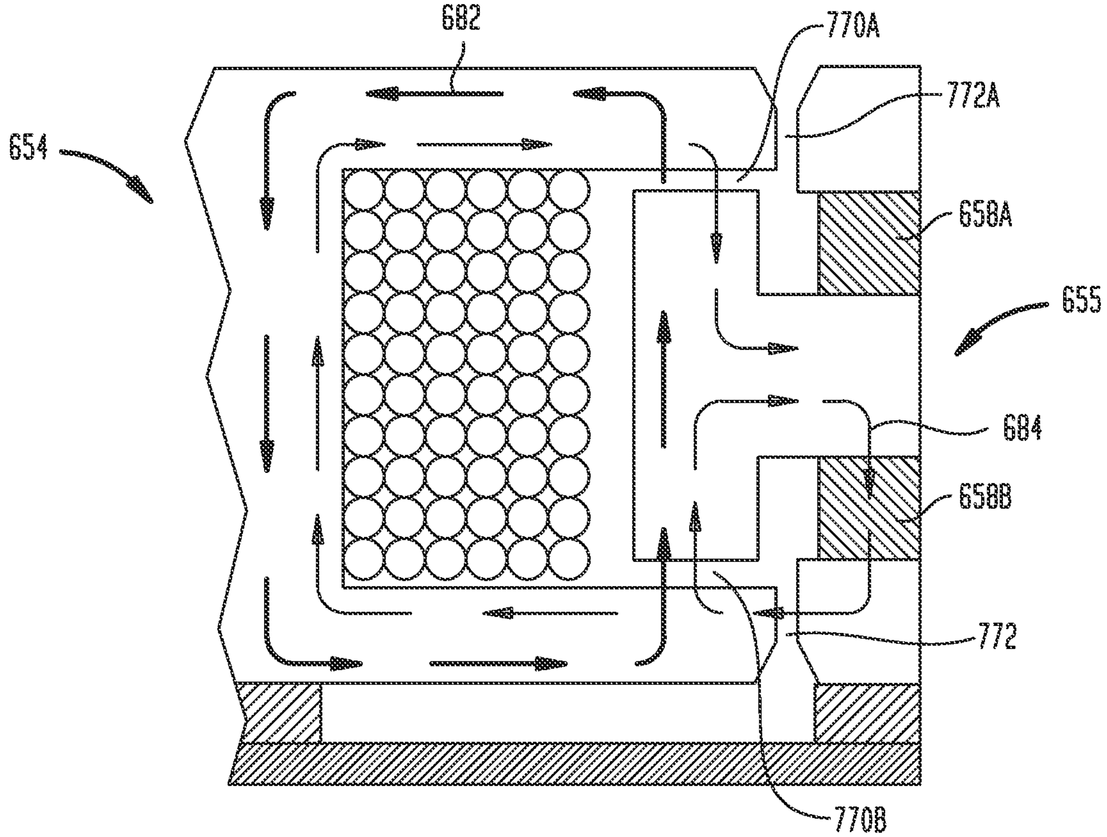

FIG. 7A is a schematic diagram detailing static magnetic flux 780 of permanent magnet 658*a* and dynamic magnetic flux 782 of coil 654*b* in the actuator 542 at the moment that coil 654*b* is energized and when bobbin assembly 654 and counterweight assembly 655 are at a balance point with respect to magnetically induced relative movement between the two (hereinafter, the "balance point"). That is, while it is to be understood that the counterweight assembly 655 moves in an oscillatory manner relative to the bobbin assembly 654 when the coil 654*b* is energized, there is an equilibrium point at the fixed location corresponding to the balance point at which the counterweight assembly 654 returns to, relative to the bobbin assembly 654, when the coil 654*b* is not energized. Note that there is also a static magnetic flux 784 of permanent magnet 658*b*, which is not shown in FIG. 7A for the sake of clarity. Instead, FIG. 7B shows static magnetic flux 784 but not static magnetic flux 780. It will be recognized that static magnetic flux 784 of FIG. 5B may be superimposed onto the schematic of FIG. 7A to reflect the static magnetic flux of electromagnetic vibrating actuator 750 (combined static magnetic fluxes 780 and 784).

During operation, the amount of static magnetic flux that flows through the associated components increases as the bobbin assembly 654 travels away from the balance point (both downward and upward away from the balance point) and decreases as the bobbin assembly 654 travels towards the balance point (both downward and upward towards the balance point).

As may be seen from FIGS. 7A and 7B, radial (static) air gaps 772*a* and 772*b* close static magnetic flux 780 and 784. It is noted that the phrase "air gap" refers to a gap between the component that produces a static magnetic field and a component that produces a dynamic magnetic field where there is a relatively high reluctance but magnetic flux still flows through the gap. The air gap closes the magnetic field. In an exemplary embodiment, the air gaps are gaps in which little to no material having substantial magnetic aspects is located in the air gap. Accordingly, an air gap is not limited to a gap that is filled by air. For example, as will be described in greater detail below, the radial air gaps may be filled with a viscous fluid such as a viscous liquid. Still further, the radial air gaps may be in the form of a non-magnetic material, such as a non-magnetic spring, which may replace and/or supplement spring 356. However, in some embodiments, the springs 656 may be made of a magnetic material, and the vibrator actuator may be configured such that the springs 656 close the static magnetic field in lieu of and/or in addition to one or more of the radial air gaps.

In vibrator actuator 542, no net magnetic force is produced at the radial air gaps. The depicted magnetic fluxes 780, 782 and 784 of FIGS. 7A and 7B will magnetically induce movement of counterweight assembly 655 downward relative to bobbin assembly 654. More specifically, vibrator actuator 542 is configured such that during operation of the actuator (and thus operation of the bone conduction device of which it is apart), an effective amount of the dynamic magnetic flux 782 and an effective amount of the static magnetic flux (flux 780 combined with flux 784) flow through at least one of axial (dynamic) air gaps 770*a* and 770*b* and an effective amount of the static magnetic flux 782 flows through at least one of radial air gaps 772*a* and 772*b* sufficient to generate substantial relative movement between counterweight assembly 655 and bobbin assembly 654.

As used herein, the phrase "effective amount of flux" refers to a flux that produces a magnetic force that impacts the performance of vibrator actuator 542, as opposed to trace flux, which may be capable of detection by sensitive equipment but has no substantial impact (e.g., the efficiency is minimally impacted) on the performance of the vibrating electromagnetic actuator. That is, the trace flux will typically not result in vibrations being generated by the electromagnetic actuator 350.

As counterweight assembly 655 moves downward relative to bobbin assembly 654, the span of axial air gap 770*a* increases and the span of axial air gap 770*b* decreases. This has the effect of substantially reducing the amount of effective static magnetic flux through axial air gap 770*a* and increasing the amount of effective static magnetic flux through axial air gap 770*b*. However, in some embodiments, the amount of effective static magnetic flux through radial air gaps 772*a* and 772*b* substantially remains about the same with respect to the flux when counterweight assembly 655 and bobbin assembly 654 are at the balance point. (Conversely, as detailed below, in other embodiments the amount is different.) This is because the distance (span) between surfaces associated with air gap 772*a* and the distance between the corresponding surfaces of air gap 772*b* remains the same, and the movement of the surfaces does not substantially misalign the surfaces to substantially impact the amount of effective static magnetic flux through radial air gaps 772*a* and 772*b*. That is, the respective surfaces sufficiently face one another to not substantially impact the flow of flux.

Upon reversal of the direction of the dynamic magnetic flux, the dynamic magnetic flux will flow in the opposite direction about coil 654*b*. However, the general directions of the static magnetic flux will not change. Accordingly, such reversal will magnetically induce movement of counterweight assembly 655 upward relative to bobbin assembly 354. As counterweight assembly 355 moves upward relative to bobbin assembly 354, the span of axial air gap 770*b* increases and the span of axial air gap 770*a* decreases. This has the effect of reducing the amount of effective static magnetic flux through axial air gap 770*b* and increasing the amount of effective static magnetic flux through axial air gap 770*a*. However, the amount of effective static magnetic flux through radial air gaps 772*a* and 772*b* does not change due to a change in the span of the axial air gaps as a result of the displacement of the counterweight assembly 655 relative to the bobbin assembly 654 for the reasons detailed above with respect to downward movement of counterweight assembly 655 relative to bobbin assembly 654.

Figure 8:
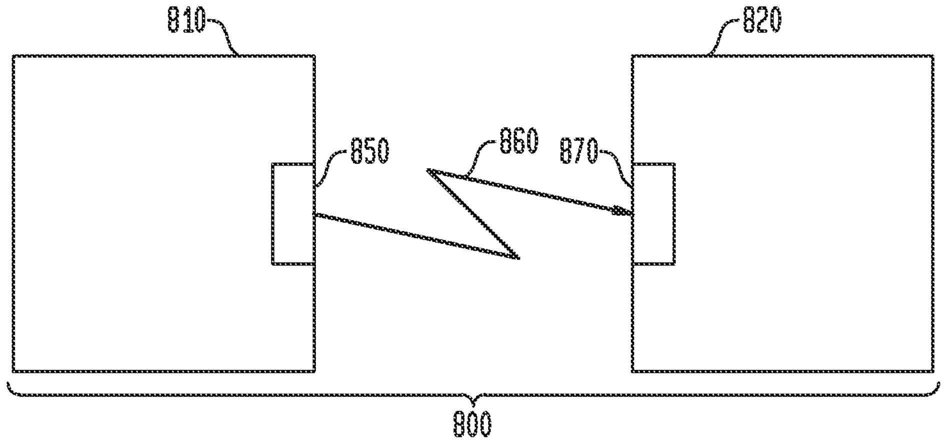
FIG. 8 depicts a functional schematic of an exemplary embodiment.

Some embodiments of the bone conduction devices detailed herein and/or variations thereof include a bone conduction system having two or more bone conduction devices. In an exemplary embodiment, the different bone conduction devices are placed at different locations on a recipient and deliver vibrations at frequency ranges having utilitarian value suitable for those locations and/or suitable for the type of bone conduction device. FIG. 8 functionally depicts such a system. Bone conduction system 800 includes a first bone conduction device 810 of a first type configured to evoke a hearing percept in the recipient within a first frequency range. Bone conduction system 800 includes a second bone conduction device 820 of a type different from that of device 810, and configured to evoke a hearing percept in the recipient within a second frequency range. In an exemplary embodiment, this second frequency range is a range including frequencies higher than the first frequency range.

Generally, the crossover frequency between devices is design specific. However, it should be noted that systems that transfer vibrations through the skin usually experience attenuation of frequencies above 2-3 kHz. At frequencies below about 600-1000 Hz the whole skull has to be vibrated as a rigid mass. As a result, bone conduction systems typically experience losses at such frequencies. On the other hand, those bone conduction devices that do reasonably well typically have a relatively large seismic mass and a low inherent resonance frequency to boost the low frequencies. In the middle frequencies of 1-2 kHz, most systems usually perform well and it is likely that a combination of systems (low-mid, mid-high frequencies) will have an overlap region where both perform well and the crossover frequency can be chosen within a relatively large range using criteria like efficiency and/or distortion. (again rather similar to conventional loudspeaker design)

BTE device 810 or 820, but not both, corresponds to any of the bone conduction devices detailed above herein, and/or variations thereof, with the potential exceptions, in some embodiments, that the BTE device 810 is configured to deliver or otherwise can be placed into a mode such that it only delivers vibrations in frequency ranges that do not encompass the entire frequency ranges of those devices and/or the device is configured to communicate with and/or control and/or be controlled by the second bone conduction device 820. Again, it is noted that these exceptions are only potential exceptions, as other embodiments of the bone conduction device 810 may correspond to any of the external devices detailed herein and/or variations thereof. That said, in the embodiment of FIG. 8, bone conduction device 810 includes a transmitter 850 configured to wirelessly transmit control signals 860 to bone conduction device 820, although other embodiments may transmit the control signals by other mechanisms (e.g., wired communication). These control signals are received by receiver-stimulator 870 of bone conduction device 820. It is noted that in an alternate embodiment, the control signals may come from a device separate from either of the bone conduction devices 810 and 820.

In an exemplary embodiment, bone conduction device 810 receives sound input and converts the sound input into electrical signals which are sent to a vibrator actuator of device 810, which vibrates. Such functionality can correspond to the functionality of, for example, BTE device 240, or other devices detailed above. However, bone conduction device 810 only delivers vibrations within a first range that excludes some frequencies. In the present embodiment of FIG. 8A, the first range is limited to generally lower and middle range frequencies of the audible spectrum (1 to 20,000 Hz). Also, bone conduction device 810 delivers control signals 860 to bone conduction device 820. Bone conduction device 820 receives these control signals, and a vibrator actuator of device 820 vibrates in response to these control signals. Bone conduction device 820 only delivers vibrations within a second range that excludes some frequencies. In the present embodiment of FIG. 8A, the second range is limited to generally middle and upper range frequencies of the audible spectrum. In an exemplary embodiment, the first and second ranges are mutually exclusive. In an alternate exemplary embodiment, the first and second ranges overlap.

As noted above, bone conduction device 810 is of a type that is different than that of bone conduction device 820. Bone conduction devices 810 and 820 may be a passive transcutaneous bone conduction device (e.g., such as the devices detailed above), an active transcutaneous bone conduction device, a percutaneous bone conduction device, etc.

Figure 9:
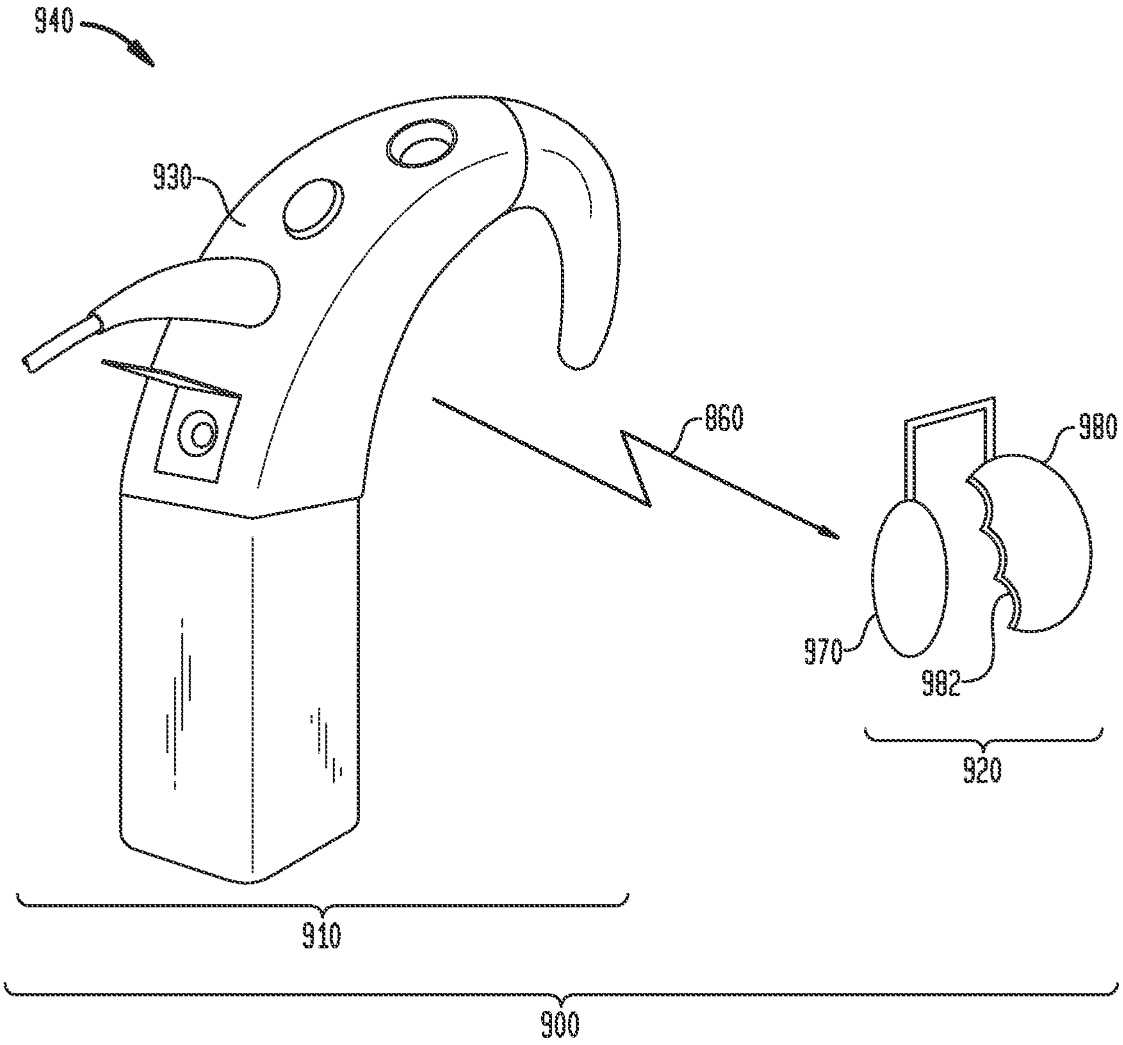
FIG. 9 depicts exemplary components of the elements of FIG. 8.

FIG. 9 depicts an exemplary embodiment of the bone conduction system 800 of FIG. 8. In FIG. 9, bone conduction system 900 corresponds to system 800 of FIG. 8, and bone conduction devices 910 and 920 correspond to bone conduction devices 810 and 820 of FIG. 8.

Bone conduction device 910 includes BTE device 940, which includes spine 930. BTE device 940 corresponds to any of the external devices detailed herein, and/or variations thereof, with the potential exceptions detailed above with respect to bone conduction device 810. In the embodiment of FIG. 9, the spine 930 of BTE device 940 includes a transmitter (not shown), corresponding to transmitter 850 of FIG. 8, configured to wirelessly transmit control signals 860 to bone conduction device 920, although other embodiments may transmit the control signals by other mechanisms (e.g., wired communication). These control signals are received by receiver-stimulator 970 of bone conduction device 920. Receiver-stimulator 970 converts these control signals into signals to control a vibrator actuator of the bone conduction device 910 to deliver vibrations corresponding generally to those of the middle and upper range frequencies of the audible spectrum.

In the exemplary embodiment of bone conduction system 900, bone conduction device 920 is an in-the-mouth (ITM) bone conduction device. Accordingly, bone conduction device 920 is of a type that is different from that of bone conduction device 910.

Specifically, vibrator actuator unit 980 includes a vibrator actuator (not shown) that vibrates in response to signals sent from receiver-stimulator 970. These vibrations are directed to a tooth or teeth of the recipient via tooth interface component 982 configured to conform to the sides of teeth of the recipient. Vibrations generated by the vibrator actuator of unit 980 are transferred from the unit into teeth of the recipient, and from there into the jaw of the recipient. In an alternative embodiment, instead of a natural tooth, an abutment or bone screw that is fixed to the jaw of the recipient extends beyond the gum line, and the vibrator actuator unit of the bone conduction device 920 is attached to the abutment.

In operation, sound is captured by BTE device 940, which breaks up the sound signal into two frequency ranges, a first frequency range and a second frequency range that includes components that are higher than the first frequency range. The BTE device 940 transmits vibrations to skin of the recipient as detailed herein and/or variations thereof to evoke a hearing percept corresponding to the first frequency range. BTE device 940 also transmits control signal to ITM device 920, which, when received by ITM device 920, transmits vibrations to a tooth or teeth of the recipient to evoke a hearing percept corresponding to the second frequency range.

Figure 10:
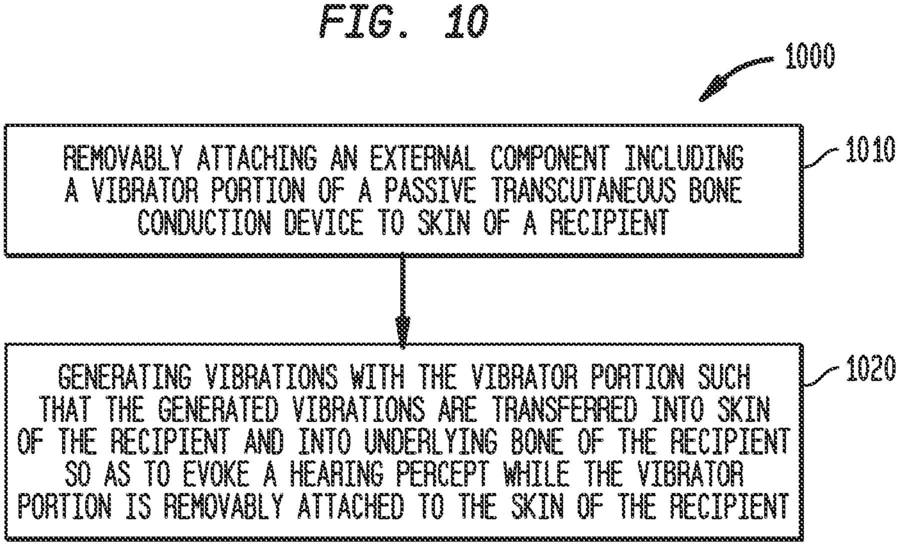
FIGS. 10 and 11 depict exemplary flowcharts for exemplary methods according to some embodiments.

FIG. 10 details an exemplary flowchart for a method 1000 according to an embodiment. Method 1000 includes method action 1010, which entails removably attaching an external component including a vibrator actuator of a passive transcutaneous bone conduction device, such as by way of example, BTE device 240 or another of the external components detailed herein and/or variations thereof, to skin of a recipient. Such removable attachment may be accomplished utilizing the adhesives detailed above. After executing method action 1010, method action 1020 is executed, although one or more intervening actions may be executed. Method action 1020 entails generating vibrations with the vibrator actuator such that the generated vibrations are transferred into skin of the recipient and into underlying bone of the recipient so as to evoke a hearing percept while the vibrator actuator is removably attached to the skin of the recipient.

Method action 1020 is executed such that the removably attachment of the external portion is maintained while generating the vibrations without substantial static pressure on the skin contacting a first location of the external component through which vibrations are transferred to the skin. By way of example, again referring to BTE device 240, the first location of the external component through which vibrations are transferred to the skin corresponds to the adhesive 255 adhering to the skin of the recipient. Substantially no static pressure is on the skin to which the adhesive 255 adheres. In an exemplary embodiment, there is no static pressure at all. However, owing to the fact that the BTE device 240 will usually never be totally supported by the auricle of the recipient due to varying dimensions of the auricle from recipient to recipient, and owing to the fact that the recipient's head will usually never be perfectly aligned such that gravity neither pulls the BTE device towards the skin nor away from the skin, there will usually be some static pressure on the skin. Still, such static pressure is not substantial.

Method action 1020 is further executed, in an exemplary embodiment, such that a dynamic pressure resulting from the transfer of the vibrations from the BTE device to the skin of the recipient at the skin contacting the first location is about equal to or greater than the static pressure at the skin contacting the first location.

The dynamic pressure resulting from sound input converted to mechanical vibrations has no lower limit so for dynamic pressure to always be equal to or greater than the static pressure, the static pressure must be zero. But a system where dynamic pressure can sometimes (for louder inputs) be greater than the static pressure could be possible. The "push" part of the waveform would still be useful as it compresses the skin anyway whereas the "pull" part would only be able to go up to the static pressure. In real life the transition would probably not be too abrupt but rather a smooth limiting that would hopefully not be too annoying. A similar thing will probably happen when there is no preload and the "pull" part has to rely on the adhesive to the skin.

By way of example, the vibrations generated by the BTE device will cause the BTE device to accelerate towards and away from the skin of the recipient a given amount. This acceleration, when combined with the mass of the BTE device, will result in a force, and thus a dynamic pressure, applied to the skin by the BTE device.

At least some of the teachings detailed herein can have utility as follows. Because the vibrations transferred to the skin from the BTE device are transferred to the skin at a location (behind the auricle to skin directly above the mastoid bone) where the skin is relatively thin, the vibrations are attenuated less than which would be the case for other locations where the skin is thicker. In an exemplary embodiment, lower frequencies are substantially effectively less attenuated due to the effects of travelling through the skin than lower frequencies, at this location. Because the vibrations transferred to the skin from the BTE device are transferred to the skin at a location relatively close to the ear canal and/or the cochlea, there is less attenuation due to the total distances travelled by the vibrations. Also, this location tends to be a low density location with respect to the number of hair follicles per given area (as compared to, for example, locations above the auricle where there is more hair, etc.). In an exemplary embodiment, such enhances the utility of the adhesives due to the relatively low number of hair follicles, as there is less hair to interfere with the adhesives.

Figure 11:
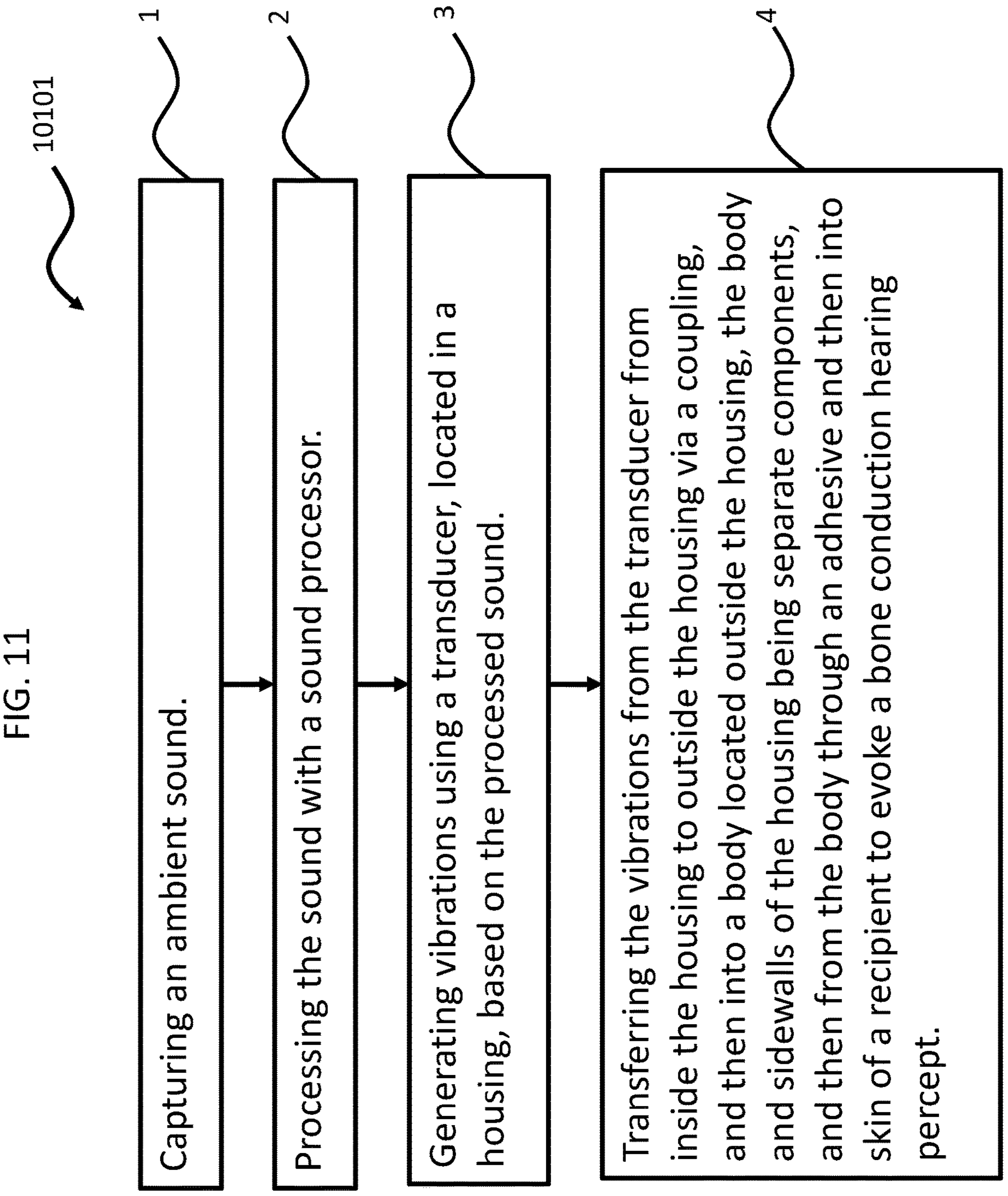

FIG. 11 presents an exemplary method, method 10101, according to an exemplary embodiment. This method 10101 comprises method action 1, which entails, capturing an ambient sound, method action 2, which entails processing the sound with a sound processor, method action 3, which entails generating vibrations using a transducer, located in a housing, based on the processed sound, and method action 4, which entails transferring the vibrations from the transducer from inside the housing to outside the housing via a coupling, and then into a body located outside the housing, the body and sidewalls of the housing being separate components, and then from the body through an adhesive and then into skin of a recipient to evoke a bone conduction hearing percept.

While various embodiments of the present invention have been described above, it should be understood that they have been presented by way of example only, and not limitation. It will be apparent to persons skilled in the relevant art that various changes in form and detail can be made therein without departing from the spirit and scope of the invention. For instance, in alternative embodiments, the BTE is combined with a bone conduction In-The-Ear device. Thus, the breadth and scope of the present invention should not be limited by any of the above described exemplary embodiments, but should be defined only in accordance with the following claims and their equivalents.

What is claimed is:

1. A method of evoking a hearing percept, comprising:

removably attaching an external component including a vibrator portion of a passive transcutaneous bone conduction device, a sound processor, and a microphone, to skin of a recipient; and generating vibrations with the vibrator portion such that the generated vibrations are transferred into skin of the recipient and into underlying bone of the recipient so as to evoke a hearing percept, wherein the vibrator portion, the sound processor and the microphone are located proximate the area of skin of the recipient into which the generated vibrations are transferred, the evocation of the hearing percept occurs while the external component is removably attached to the skin of the recipient, the removable attachment of the external component is maintained while generating the vibrations without substantial static pressure on the skin contacting a first location of the external component through which vibrations are transferred to the skin, and the external component is a behind-the-ear (BTE) device, the BTE device including a battery so that the battery is located behind an auricle of the recipient when the BTE device is attached to the recipient, the microphone is configured to capture sound from an ambient environment of the recipient, the vibrator portion is located between opposite sidewalls of a housing of the BTE device, which housing is contoured to the auricle, and a first adhesive for adhering to skin is located on a first side of the housing, and a second adhesive for adhering to skin is located on the second side of the housing.

2. The method of claim 1, wherein:

the action of generating vibrations is executed using a balanced transducer.

3. The method of claim 1, wherein:

the action of generating vibrations is executed by controllably channeling a dynamic magnetic flux across a plurality of axial air gaps of a transducer and channeling static magnetic flux across a radial air gap of the transducer.

4. The method of claim 3, wherein:

the action of generating vibrations is executed by channeling the static magnetic flux across at least one of the axial air gaps of the plurality of axial air gaps.

5. The method of claim 1, wherein:

the external component is a behind-the-ear (BTE) device.

6. The method of claim 5, wherein:

the action generating the vibrations to evoke a hearing percept is executed with the BTE device on one side of a head of the recipient of the BTE device; and the method further comprises:

moving the BTE device to an opposite side of the head of the recipient and generating vibrations with the vibrator portion such that the generated vibrations are transferred into skin of the recipient on the opposite side of the head and into underlying bone of the recipient on the opposite side of the head so as to evoke a second hearing percept.

7. The method of claim 1, wherein:

the external component is an external component of a first bone conduction device, and the evocation of the hearing percept is based on a captured sound captured by the first bone conduction device and is executed within a first frequency range;

the evocation of the hearing percept occurs while the external component is removably attached to the skin of the recipient;

the method further includes evoking a hearing percept with a second bone conduction device based on a captured sound captured by the second bone conduction device within a second frequency range, the second frequency range being a range including frequencies higher than the first frequency range, and the captured sound captured by the first bone conduction device is the captured sound captured by the second bone conduction device.

8. The method of claim 3, wherein:

the action of generating vibrations is executed by channeling the static magnetic flux across a plurality of radial air gaps of the transducer, one of which is the radial air gap of the transducer.

9. The method of claim 1, wherein:

the action of generating vibrations is executed using a transducer with a bobbin that is part of a dynamic magnetic field generator; and the bobbin remains stationary relative to a housing of the external component, the housing containing the sound processor and the transducer.

10. A method of evoking a hearing percept, comprising:

removably attaching an external component including a vibrator portion of a passive transcutaneous bone conduction device, a sound processor, and a microphone, to skin of a recipient; and generating vibrations with the vibrator portion such that the generated vibrations are transferred into skin of the recipient and into underlying bone of the recipient so as to evoke a hearing percept, wherein the vibrator portion, the sound processor and the microphone are located proximate the area of skin of the recipient into which the generated vibrations are transferred;

the external component is a behind-the-ear (BTE) device, the action generating the vibrations to evoke a hearing percept is executed with the BTE device on one side of a head of the recipient of the BTE device, the method further comprises:

moving the BTE device to an opposite side of the head of the recipient and generating vibrations with the vibrator portion such that the generated vibrations are transferred into skin of the recipient on the opposite side of the head and into underlying bone of the recipient on the opposite side of the head so as to evoke a second hearing percept, and a portion of the BTE device facing forward, relative to a face of a recipient, when used on the one side of the head also faces forward when used on the opposite side of the head.

11. The method of claim 10, wherein:

a dynamic pressure resulting from the transfer of the vibrations into the skin of the recipient at skin contacting a first location of the external component through which vibrations are transferred is about equal to or greater than the static pressure at the skin contacting the first location.

12. The method of claim 10, wherein:

the action of removably attaching the external component to skin of the recipient includes adhesively attaching the external component to skin of the recipient.

13. The method of claim 10, wherein:

the action of generating vibrations is executed by controllably channeling a dynamic magnetic flux across a plurality of axial air gaps of a transducer and channeling static magnetic flux across a radial air gap of the transducer, wherein no net magnetic force is produced at the radial air gap.

14. The method of claim 10, wherein:

the transducer has a seismic mass that moves relative to the housing.

15. A method of evoking a hearing percept, comprising:

removably attaching an external component including a vibrator portion of a passive transcutaneous bone conduction device, a sound processor, and a microphone, to skin of a recipient; and generating vibrations with the vibrator portion such that the generated vibrations are transferred into skin of the recipient and into underlying bone of the recipient so as to evoke a hearing percept, wherein the vibrator portion, the sound processor and the microphone are located proximate the area of skin of the recipient into which the generated vibrations are transferred, and the action of generating vibrations is executed using a transducer with at least two static magnetic flux circuits where a first of the at least two static magnetic flux circuits is located on a first side of a plane normal to a longitudinal axis of the transducer and a second of the at least two static magnetic flux circuits is located on a second side of the plane opposite the first side.

16. The method of claim 15, wherein:

the evocation of the hearing percept occurs while the external component is removably attached to the skin of the recipient; and the removable attachment of the external component is maintained while generating the vibrations without substantial static pressure on the skin contacting a first location of the external component through which vibrations are transferred to the skin.

17. The method of claim 16, wherein:

a dynamic pressure resulting from the transfer of the vibrations to the skin of the recipient at skin contacting a first location of the external component through which vibrations are transferred is about equal to or greater than the static pressure at the skin contacting the first location.

18. The method of claim 16, wherein:

the action of removably attaching the external component to skin of the recipient includes adhesively attaching the external component to skin of the recipient.

19. The method of claim 15, wherein:

the action of removably attaching the external component to skin of the recipient includes attaching the external component at skin contacting a first location of the external component through which vibrations are transferred to the skin, the first location being directly above a mastoid bone of the recipient; and the removable attachment of the external component is maintained while generating the vibrations without substantial static pressure on the skin contacting a first location of the external component through which vibrations are transferred to the skin, and the hearing percept is evoked while the vibrator portion is removably attached to the skin of the recipient.

20. The method of claim 15, wherein:

the external component is a behind-the-ear (BTE) device.

21. The method of claim 15, wherein:

the external component is an external component of a first bone conduction device of a first type configured to evoke a hearing percept within a first frequency range;

the evocation of the hearing percept occurs while the external component is removably attached to the skin of the recipient;

the removable attachment of the external component is maintained while generating the vibrations without substantial static pressure on the skin contacting a first location of the external component through which vibrations are transferred to the skin;

the method comprises evoking a hearing percept with the external component within the first frequency range; and the method further includes evoking a hearing percept with a second bone conduction device of a second type different from that of the first type within a second frequency range, the second frequency range being a range including frequencies higher than the first frequency range.

22. The method of claim 21, wherein:

the method further comprises placing the first bone conduction device into a mode such that the first bone conduction device delivers vibrations in frequency ranges that do not encompass the entire first frequency range of that device.

23. The method of claim 16, wherein:

the external component is an external component of a first bone conduction device configured to evoke a hearing percept within a first frequency range; and the method further comprises placing the first bone conduction device into a mode such that the first bone conduction device delivers vibrations in frequency ranges that do not encompass the entire first frequency range of that device.

24. The method of claim 15, wherein:

the action of generating vibrations is executed by controllably channeling magnetic fluxes across a plurality of air gaps, wherein a net distance of the combined distance across all of the axial air gaps of the plurality of air gaps remains constant during the action of generating vibrations.

* * * * *